(12) United States Patent
Boyer et al.

(10) Patent No.: US 10,800,105 B2
(45) Date of Patent: Oct. 13, 2020

(54) AUGMENTED THREE-DIMENSIONAL PRINTING

(71) Applicant: MakerBot Industries, LLC, Brooklyn, NY (US)

(72) Inventors: Hugo Boyer, Brooklyn, NY (US); Ariel Douglas, Brooklyn, NY (US); Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 19 days.

(21) Appl. No.: 15/854,695

(22) Filed: Dec. 26, 2017

(65) Prior Publication Data

US 2018/0133970 A1    May 17, 2018

Related U.S. Application Data

(63) Continuation of application No. 13/624,117, filed on Sep. 21, 2012, now abandoned.

(60) Provisional application No. 61/677,749, filed on Jul. 31, 2012.

(51) Int. Cl.
| | |
|---|---|
| *B29C 64/386* | (2017.01) |
| *B33Y 30/00* | (2015.01) |
| *B33Y 50/02* | (2015.01) |
| *B33Y 50/00* | (2015.01) |
| *B33Y 10/00* | (2015.01) |
| *B29C 64/106* | (2017.01) |
| *B29C 64/00* | (2017.01) |

(Continued)

(52) U.S. Cl.
CPC ............ *B29C 64/386* (2017.08); *B29C 64/00* (2017.08); *B29C 64/10* (2017.08); *B29C 64/106* (2017.08); *B29C 64/112* (2017.08); *B29C 64/393* (2017.08); *B33Y 10/00* (2014.12); *B33Y 30/00* (2014.12); *B33Y 40/00* (2014.12); *B33Y 50/00* (2014.12); *B33Y 50/02* (2014.12); *B33Y 80/00* (2014.12)

(58) Field of Classification Search
CPC ......... B33Y 30/00; B33Y 50/02; B33Y 50/00; B33Y 10/00; B29C 64/00; B29C 64/112; B29C 37/005; B29C 41/48; B29C 41/52; B29C 64/386; B29C 41/02; B29C 2037/90; G06F 3/1203; B22F 2998/00; H04N 5/2258
See application file for complete search history.

(56) References Cited

U.S. PATENT DOCUMENTS

| | | |
|---|---|---|
| 5,317,726 A | 5/1994 | Horst |
| 5,402,351 A | 3/1995 | Batchelder et al. |

(Continued)

FOREIGN PATENT DOCUMENTS

| | | |
|---|---|---|
| EP | 1590149 | 10/2008 |
| EP | 2216697 | 8/2010 |

OTHER PUBLICATIONS

"3D Funpod", http://phlatboyz.blogspot.com/2012/02/3d-printed-micro-3d-3d-funpod-3d-funpod.html Feb. 8, 2012, pp. 1-3.

(Continued)

*Primary Examiner* — Darrin D Dunn
(74) *Attorney, Agent, or Firm* — Strategic Patents, P.C.

(57) ABSTRACT

A variety of techniques are disclosed for visual and functional augmentation of a three-dimensional printer.

19 Claims, 4 Drawing Sheets

(51) Int. Cl.
*B29C 64/393* (2017.01)
*B29C 64/112* (2017.01)
*B29C 64/10* (2017.01)
*B33Y 80/00* (2015.01)
*B33Y 40/00* (2020.01)

(56) References Cited

U.S. PATENT DOCUMENTS

| | | |
|---|---|---|
| 5,426,722 A | 6/1995 | Batchelder |
| 5,461,570 A | 10/1995 | Wang et al. |
| 5,588,118 A | 12/1996 | Mandava et al. |
| 5,793,648 A | 8/1998 | Nagle et al. |
| 5,892,808 A | 4/1999 | Goulding et al. |
| 6,129,872 A | 10/2000 | Jang |
| 6,193,923 B1 | 2/2001 | Leyden et al. |
| 6,259,962 B1 | 7/2001 | Gothait et al. |
| 6,470,230 B1* | 10/2002 | Toprac ............... G03F 7/70625 257/E21.525 |
| 6,564,112 B1 | 5/2003 | Factor et al. |
| 6,600,129 B2 | 7/2003 | Shen et al. |
| 6,760,488 B1 | 7/2004 | Moura et al. |
| 6,998,087 B1 | 2/2006 | Hanson et al. |
| 7,209,797 B2* | 4/2007 | Kritchman ............... B29C 41/48 700/118 |
| 7,371,590 B2* | 5/2008 | Capaldo ............. G01N 21/8806 438/14 |
| 7,555,357 B2* | 6/2009 | Holzwarth ............ B29C 64/106 700/118 |
| 7,747,341 B2 | 6/2010 | Dubois et al. |
| 7,887,978 B2 | 2/2011 | Griebenow et al. |
| 7,898,696 B2* | 3/2011 | Marchesotti .......... H04N 1/603 358/1.15 |
| 8,103,085 B1 | 1/2012 | Zadeh |
| 8,170,302 B1 | 5/2012 | Gleason et al. |
| 8,252,234 B2 | 8/2012 | Clarke et al. |
| 8,412,588 B1 | 4/2013 | Bodell et al. |
| 8,425,218 B2* | 4/2013 | Pettis ...................... G06F 3/12 425/150 |
| 8,546,717 B2 | 10/2013 | Stecker |
| 8,562,324 B2* | 10/2013 | Pettis ...................... G06F 3/12 425/150 |
| 9,471,654 B1* | 10/2016 | Bradley ............. G06F 16/258 |
| 10,295,993 B2* | 5/2019 | Choi ................ G05B 19/41875 |
| 2002/0052702 A1* | 5/2002 | Keller .............. G05B 19/41875 702/84 |
| 2002/0113331 A1 | 8/2002 | Zhang et al. |
| 2002/0155628 A1* | 10/2002 | Bulaga ................. H01L 22/20 438/14 |
| 2002/0166220 A1 | 11/2002 | Imundo et al. |
| 2003/0059334 A1 | 3/2003 | Shen et al. |
| 2003/0105538 A1 | 6/2003 | Wooten et al. |
| 2003/0151167 A1 | 8/2003 | Kritchman et al. |
| 2003/0152276 A1 | 8/2003 | Kondo et al. |
| 2003/0155415 A1* | 8/2003 | Markham .............. G06Q 10/00 235/376 |
| 2003/0168762 A1 | 9/2003 | Zikeli et al. |
| 2003/0171897 A1 | 9/2003 | Bieda et al. |
| 2004/0032979 A1 | 2/2004 | Honda et al. |
| 2004/0043806 A1 | 3/2004 | Kirby et al. |
| 2004/0089811 A1 | 5/2004 | Lewis et al. |
| 2004/0200816 A1 | 10/2004 | Chung et al. |
| 2004/0254665 A1* | 12/2004 | Fink ...................... B29C 64/153 700/98 |
| 2005/0025354 A1 | 2/2005 | Macy et al. |
| 2005/0038549 A1 | 2/2005 | Loughran |
| 2005/0058573 A1 | 3/2005 | Frost et al. |
| 2005/0157919 A1 | 7/2005 | Di Santo et al. |
| 2005/0288813 A1 | 12/2005 | Yang et al. |
| 2006/0054039 A1* | 3/2006 | Kritchman ............... B29C 41/48 101/424.1 |
| 2006/0100934 A1 | 5/2006 | Burr et al. |
| 2006/0111807 A1* | 5/2006 | Gothait .................. B33Y 30/00 700/119 |
| 2006/0271346 A1* | 11/2006 | Lonn ...................... G06F 11/008 703/22 |
| 2006/0293906 A1 | 12/2006 | Wilson et al. |
| 2007/0084047 A1 | 4/2007 | Lange et al. |
| 2007/0098929 A1 | 5/2007 | Dietrich et al. |
| 2007/0117225 A1* | 5/2007 | Capaldo ............. G01N 21/8806 438/14 |
| 2007/0173967 A1* | 7/2007 | Kritchman ............... B29C 41/48 700/118 |
| 2007/0276835 A1* | 11/2007 | Murthy ................ G06F 21/6227 |
| 2008/0071030 A1 | 3/2008 | Priedeman |
| 2008/0110395 A1* | 5/2008 | Kritchman ............... B29C 41/48 118/300 |
| 2008/0120086 A1 | 5/2008 | Lilley et al. |
| 2008/0166480 A1* | 7/2008 | Kritchman ............... B29C 41/48 427/258 |
| 2008/0269939 A1* | 10/2008 | Kritchman ............... B29C 41/48 700/119 |
| 2009/0017714 A1 | 1/2009 | DeRennaux et al. |
| 2009/0177309 A1 | 7/2009 | Kozlak |
| 2010/0138026 A1* | 6/2010 | Kaushal ............... G05B 13/0265 700/104 |
| 2010/0260410 A1* | 10/2010 | Taminger .............. H01J 37/304 382/141 |
| 2010/0270707 A1* | 10/2010 | Priedeman, Jr. ........ B29C 41/08 264/308 |
| 2010/0305743 A1 | 12/2010 | Larsson |
| 2011/0087350 A1* | 4/2011 | Fogel ...................... G06F 17/50 700/98 |
| 2011/0099810 A1 | 5/2011 | Stankowski et al. |
| 2011/0137450 A1 | 6/2011 | Glässer et al. |
| 2011/0149331 A1* | 6/2011 | Duggan ................. G06K 9/036 358/1.14 |
| 2011/0190917 A1* | 8/2011 | Moyne ...................... G16Z 99/00 700/103 |
| 2012/0053716 A1* | 3/2012 | Bickel ...................... G06F 17/50 700/98 |
| 2012/0092724 A1* | 4/2012 | Pettis ...................... B29C 64/386 358/1.15 |
| 2012/0095732 A1 | 4/2012 | Fisker et al. |
| 2012/0105903 A1 | 5/2012 | Pettis |
| 2012/0113457 A1* | 5/2012 | Pettis ...................... G06F 3/12 358/1.14 |
| 2012/0113473 A1 | 5/2012 | Pettis |
| 2012/0198676 A1 | 8/2012 | Rickenbacher et al. |
| 2012/0201960 A1 | 8/2012 | Hartmann et al. |
| 2012/0231225 A1 | 9/2012 | Mikulak et al. |
| 2012/0261848 A1 | 10/2012 | Haraszati et al. |
| 2012/0320086 A1* | 12/2012 | Kasama ................. H04N 5/2258 345/629 |
| 2013/0044190 A1 | 2/2013 | Hu et al. |
| 2013/0124151 A1 | 5/2013 | Mech et al. |
| 2013/0144392 A1 | 6/2013 | Hughes et al. |
| 2013/0158963 A1 | 6/2013 | Brooks et al. |
| 2013/0189435 A1 | 7/2013 | Mackie et al. |
| 2013/0220570 A1 | 8/2013 | Sears et al. |
| 2013/0297062 A1 | 11/2013 | Lacaze et al. |
| 2013/0316081 A1 | 11/2013 | Kovalcik et al. |
| 2014/0023996 A1 | 1/2014 | Finn et al. |
| 2014/0035182 A1 | 2/2014 | Boyer et al. |
| 2014/0039662 A1 | 2/2014 | Boyer et al. |
| 2014/0039663 A1 | 2/2014 | Boyer et al. |
| 2014/0046473 A1 | 2/2014 | Boynton et al. |
| 2014/0129020 A1 | 5/2014 | Kroner et al. |
| 2014/0129021 A1 | 5/2014 | Boynton et al. |
| 2014/0129022 A1 | 5/2014 | Briscella et al. |
| 2014/0214684 A1 | 7/2014 | Pell et al. |
| 2014/0228860 A1 | 8/2014 | Steines et al. |
| 2014/0244433 A1 | 8/2014 | Cruz et al. |
| 2017/0109646 A1* | 4/2017 | David .................... H01L 22/12 |

OTHER PUBLICATIONS

"Ultra-Bot 3D Printer, William Steele", http://www.kickstarter.com/projects/wjsteele/ultra-bot-3d-printer/posts/362119 NPL-20 Dec. 4, 2012, pp. 1-17.

(56) References Cited

OTHER PUBLICATIONS

USPTO, "U.S. Appl. No. 13/624,117 Final Office Action dated Sep. 25, 2017", 23 Pages.
USPTO, "U.S. Appl. No. 13/653,559 Final Office Action dated Nov. 2, 2016", 22 pages.
USPTO, "U.S. Appl. No. 14/067,043 Final Office Action dated Nov. 17, 2016", 19 pages.
USPTO, "U.S. Appl. No. 14/067,264 Notice of Allowance dated Nov. 1, 2016", 17 pages.
USPTO, "U.S. Appl. No. 14/067,427 Final Office Action dated Nov. 14, 2016", 24 pages.
USPTO, "U.S. Appl. No. 13/624,117, Final Office Action dated Jun. 17, 2015", 17 pages.
USPTO, "U.S. Appl. No. 13/624,117, Final Office Action dated Aug. 26, 2016", 27 pages.
USPTO, "U.S. Appl. No. 13/624,117, Non-Final Office Action dated Feb. 1, 2016", 24 pages.
USPTO, "U.S. Appl. No. 13/624,117, Non-Final Office Action dated Feb. 13, 2015", 22 pages.
USPTO, "U.S. Appl. No. 13/653,559, Final Office Action dated Feb. 1, 2016", 21 Pages.
USPTO, "U.S. Appl. No. 13/653,559, Non-Final Office Action dated Jun. 30, 2016", 23 pages.
USPTO, "U.S. Appl. No. 13/653,559, Non-Final Office Action dated Sep. 18, 2015", 24 pages.
USPTO, "U.S. Appl. No. 13/653,791, Final Office Action dated May 19, 2016", 14 pages.
USPTO, "U.S. Appl. No. 13/653,791, Non-Final Office Action dated Oct. 20, 2016", 19 pages.
USPTO, "U.S. Appl. No. 13/653,791, Non-Final Office Action dated Nov. 20, 2015", 10 pages.
USPTO, "U.S. Appl. No. 14/067,264, Non-Final Office Action dated Apr. 28, 2016", 20 pages.
USPTO, "U.S. Appl. No. 14/067,427, Non-Final Office Action dated May 12, 2016", 22 pages.
USPTO, "U.S. Appl. No. 13/624,117, Non-Final Office Action dated Feb. 8, 2017", 23 pages.
USPTO, "U.S. Appl. No. 13/653,791, Final Office Action dated Feb. 23, 2017", 26 pages.
USPTO, "U.S. Appl. No. 13/962,793, Final Office Action dated Oct. 5, 2016", 19 pages.
USPTO, "U.S. Appl. No. 13/962,793, Non-Final Office Action dated Mar. 22, 2016", 21 pages.
USPTO, "U.S. Appl. No. 14/067,043, Non-Final Office Action dated Apr. 19, 2016", 17 pages.
USPTO, "U.S. Appl. No. 14/067,264, Notice of Allowance dated Mar. 23, 2017", 10 pages.

\* cited by examiner

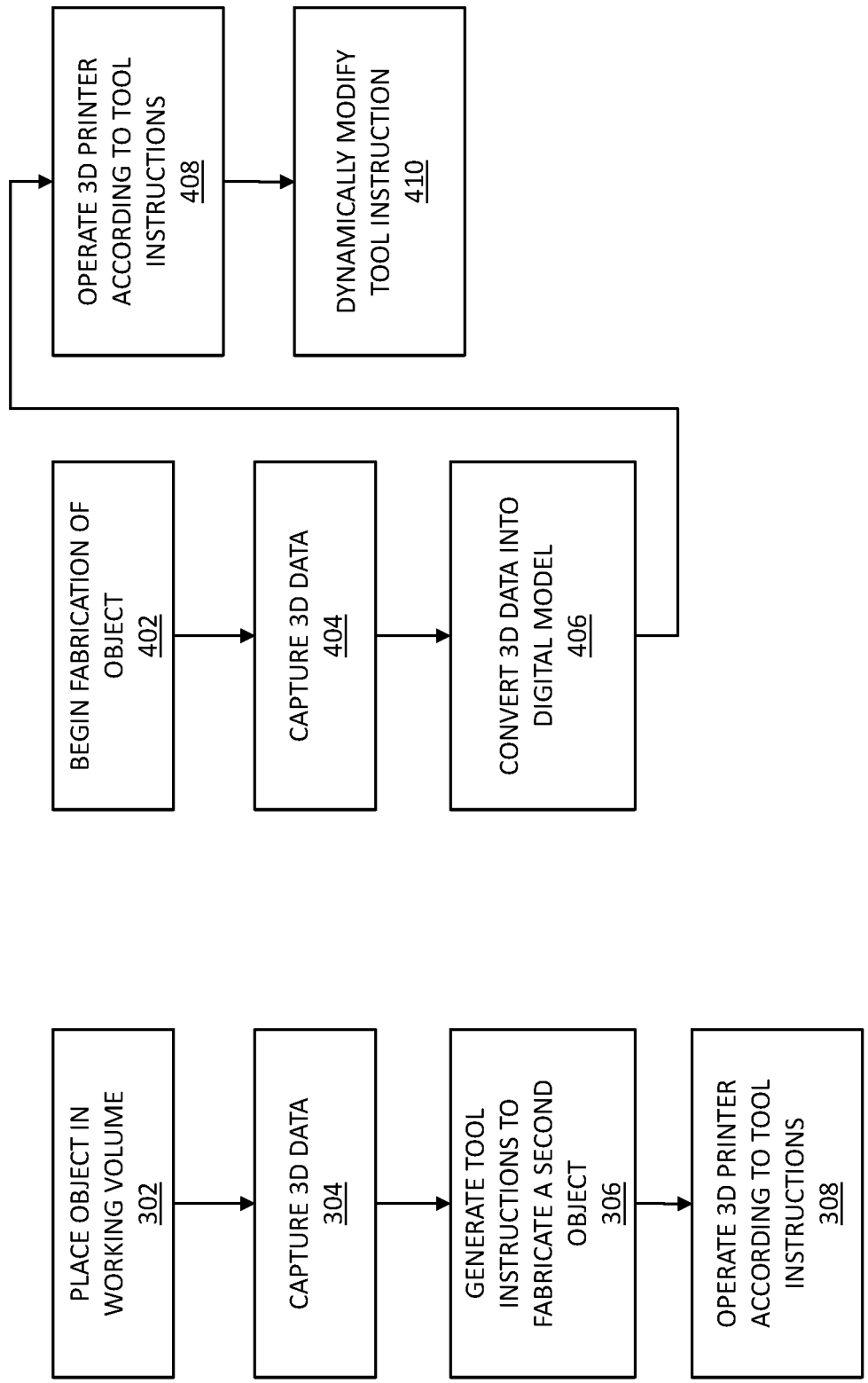

AUGMENTED THREE-DIMENSIONAL PRINTING

RELATED APPLICATIONS

This application is a continuation of U.S. patent application Ser. No. 13/624,117 filed on Sep. 21, 2012, which claims the benefit of U.S. App. No. 61/677,749 filed on Jul. 31, 2012, the entire content of which is hereby incorporated by reference.

BACKGROUND

There remains a need for improved three-dimensional printing techniques using computer and vision augmentation.

SUMMARY

A variety of techniques are disclosed for visual and functional augmentation of a three-dimensional printer.

BRIEF DESCRIPTION OF THE FIGURES

The invention and the following detailed description of certain embodiments thereof may be understood by reference to the following figures:

FIG. 3 shows a method for operating a three-dimensional printer.

FIG. 4 shows a method for operating a three-dimensional printer

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
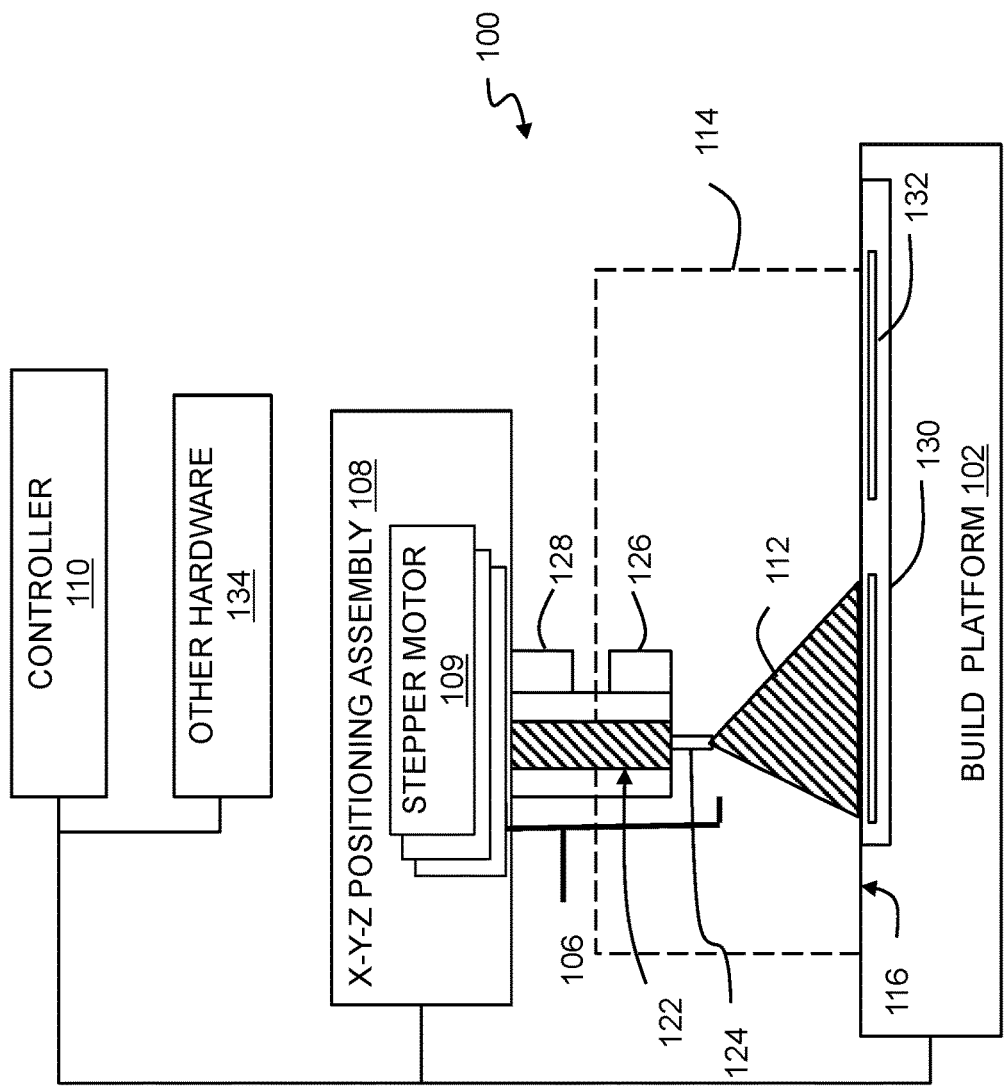
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
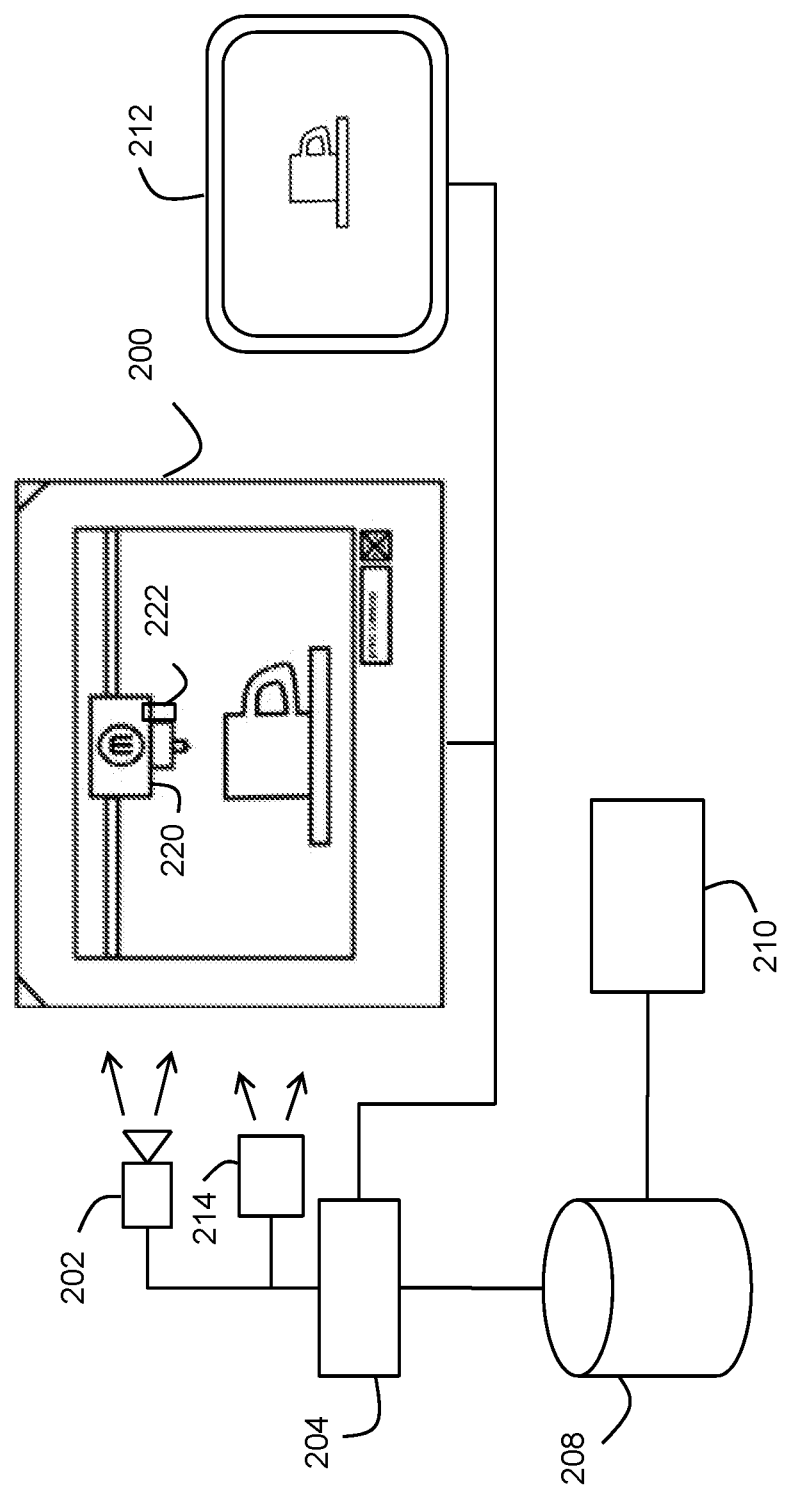
FIG. 2 shows a three-dimensional printer.

FIG. 2 shows a three-dimensional printer. The printer 200 may include a camera 202 and a processor 204. The printer 200 may be configured for augmented operation using two-dimensional data acquired from the camera 202.

The printer 200 may, for example, be any of the three-dimensional printers described above.

The camera 202 may be any digital still camera, video camera, or other image sensor(s) positioned to capture images of the printer 200, or the working volume of the printer 200.

The processor 204, which may be an internal processor of the printer 200, an additional processor provided for augmented operation as contemplated herein, a processor of a desktop computer or the like locally coupled to the printer 200, a server or other processor coupled to the printer 200 through a data network, or any other processor or processing circuitry. In general, the processor 204 may be configured to control operation of the printer 200 to fabricate an object from a build material. The processor 204 may be further configured to adjust a parameter of the printer 200 based upon an analysis of the object in the image. It should be appreciated that the processor 204 may include a number of different processors cooperating to perform the steps described herein, such as where an internal processor of the printer 200 controls operation of the printer 200 while a connected processor of a desktop computer performs image processing used to control print parameters.

A variety of parameters may be usefully adjusted during a fabrication process. For example, the parameter may be a temperature of the working volume. This temperature may be increased or decreased based upon, e.g., an analysis of road dimensions (e.g. height and width of line of deposited build material), or the temperature may be adjusted according to a dimensional stability of a partially fabricated object. Thus, where sagging or other variations from an intended shape are detected, the temperature may be decreased. Similarly, where cooling-induced warping or separation of layers is detected, the temperature may be increased. The working volume temperature may be controlled using a variety of techniques such as with active heating elements and/or use of heated or cooled air circulating through the working volume.

Another parameter that may be usefully controlled according to the camera image is the temperature of a build platform in the working volume. For example, the camera 202 may capture an image of a raft or other base layer for a fabrication, or a first layer of the fabricated object, and may identify defects such as improper spacing between adjacent lines of build material or separation of the initial layer from the build platform. The temperature of the build platform may in such cases be heated in order to alleviate cooling-induced warping of the fabricated object at the object-platform interface.

Another parameter that may be usefully controlled according to an analysis of the camera image is the extrusion temperature of an extruder. By heating or cooling the extruder, the viscosity of a build material may be adjusted in order to achieve a desired material deposition rate and shape, as well as appropriate adhesion to underlying layers of build material. Where roads of material deviate from a predetermined cross-sectional shape, or otherwise contain visible defects, the extrusion temperature of the extruder may be adjusted to compensate for such defects.

Similarly, the parameter may be an extrusion rate of a build material from the extruder. By controlling a drive motor or other hardware that forces build material through the extruder, the volumetric rate of material delivery may be controlled, such as to reduce gaps between adjacent lines of build material, or to reduce bulges due to excess build material.

In another aspect, the parameter may be a viscosity of build material, which may be controlled, e.g., by controlling the extruder temperature or any other controllable element that can transfer heat to and from build material as it passes through the extruder. It will be understood that temperature control is one technique for controlling viscosity, but other techniques are known and may be suitable employed, such as by selectively delivering a solvent or the like into the path of the build material in order to control thermal characteristics of the build material.

Another parameter that may be usefully controlled is a movement speed of the extruder during an extrusion. By changing the rate of travel of the extruder, other properties of the build (e.g., road thickness, spatial rate of material delivery, and so forth) may be controlled in response to images captured by the camera 202 and analyzed by the processor 204.

In another aspect, the parameter may be a layer height. By controlling the z-positioning hardware of the printer 200, the layer height may be dynamically adjusted during a build.

The printer may include a memory 208, such as a local memory or a remote storage device, that stores a log of data for an object being fabricated including without limitation a value or one or more of the parameters described above, or any other data relating to a print. The memory 208 may also or instead store a log of data aggregated from a number of fabrications of a particular object, which may include data from the printer 200 and/or data from a number of other three-dimensional printers.

A second processor 210, such as a processor on a server or other remote processing resource, may be configured to analyze the log of data in the memory 208 to identify a feature of the object that is difficult to print. For example, where a corner, overhang, or the like consistently fails, this may be identified by analysis of the log of data, particularly where such failures can be automatically detected based upon analysis of images from the camera 202. Such failures may be logged in any suitable manner including quantitatively as data characterizing the failure (based upon image analysis), metadata (e.g., percent completion, build parameters, and so forth) and/or a simple failure flag, which may be accompanied by an image of the failed build. In this manner, the second processor 210 can identify features that should be avoided in printable models, and/or objects that are generally difficult or impossible to print. The second processor 210 may also or instead be configured to analyze the results of variations in one or more of the parameters described above. It will be understood that, while the second processor 210 may be usefully located on a remote processing resource such as a server, the second processor 210 may also be the same as the processor 204, with logging and related analysis performed locally by the printer 200 or a locally coupled computer.

The printer 200 may optionally include a display 212 configured to display a view of the working volume. The display 212, which may obtain images of the working volume from the camera 202 or any other suitable imaging hardware, may be configured, e.g., by the processor 204, to superimpose thermal data onto the view of the working volume. This may, for example, include thermistor data or data from other temperature sensors or similar instrumentation on the printer 200. For example, the printer 200 may include sensors for measuring a temperature of at least one of the extruder, the object, the build material, the working volume, an ambient temperature outside the working volume, and a build platform within the working volume. These and any similar instrumentation may be used to obtain thermal data correlated to specific or general regions within and without the printer 200. Where the camera 202 includes an infrared camera, the thermal data may also or instead include an infrared image, or a thermal image derived from such an infrared image.

The display 212 may serve other useful purposes. For example, the view from the camera 202 may be presented in the display. The processor 204 may be configured to render an image of a three-dimensional model used to fabricate an object from the pose of the camera 202. If the camera 202 is a fixed camera then the pose may be a predetermined pose corresponding to the camera position and orientation. If the camera 202 is a moving camera, the processor 204 may be further programmed to determine a pose of the camera 202 based upon, e.g., fiducials or known, visually identifiable objects within the working volume such as corners of a build platform or a tool head, or to determine the pose using data from sensors coupled to the camera and/or from any actuators used to move the camera. The rendered image of the three-dimensional model rendered from this pose may be superimposed on the view of the working volume within the display 212. In this manner, the printer 200 may provide a preview of an object based upon a digital three-dimensional model, which preview may be rendered within the display 212 for the printer, or a user interface of the display, with the as-fabricated size, orientation, and so forth. In order to enhance the preview, other features such as build material color may also be rendered using texture mapping or the like for the rendered image. This may assist a user in selecting build material, scaling, and so forth for an object that is to be fabricated from a digital model.

In another aspect, the printer 200 may optionally include a sensor 214 for capturing three-dimensional data from the object. A variety of suitable sensors are known in the art, such as a laser sensor, an acoustical range finding sensor, an x-ray sensor, and a millimeter wave radar system, any of which may be adapted alone or in various combinations to capture three-dimensional data. The display 212 may be configured to superimpose such three-dimensional data onto the display of the object within the working volume. In this manner, the processor 204 may detect one or more dimensional inaccuracies in the object, such as by comparison of three-dimensional measurements to a digital model used to fabricate the object. These may be presented as dimensional annotations within the display 212, or as color-coded regions (e.g., yellow for small deviations, red for large deviations, or any other suitable color scheme) superimposed on the display of the object. The processor 206 may be further configured to show summary data in the display 212 concerning any dimensional inaccuracies detected within the object.

The sensor 214 may more generally include one or more spatial sensors configured to capture data from the object placed within the working volume. The second processor 210 (which may be the processor 204) may convert this data into a digital model of the object, and the processor 204 may be configured to operate the printer 200 to fabricate a geometrically related object within the working volume based upon the digital model. In this manner, the printer 200 may be used for direct replication of objects simply by placing an object into the working volume, performing a scan to obtain the digital model, removing the object from the working volume, and then fabricating a replica of the object based upon the digital model. More generally, any geometrically related shape may be usefully fabricated using similar techniques.

For example, the geometrically related object may be a three-dimensional copy of the object, which may be a scaled copy, and/or which may be repeated as many times as desired in a single build subject to spatial limitations of the working volume and printer 200. In another aspect, the geometrically related object may include material to enclose a portion of the object. In this manner, a container or other enclosure for the object may be fabricated. In another aspect, the geometrically related object may include a mating surface to the object, e.g., so that the fabricated object can be coupled to the original source object. This may be particularly useful for fabrication of snap on parts such as aesthetic or functional accessories, or any other objects that might be usefully physically mated to other objects. Similarly, a repair piece for a broken object may be fabricated with a surface matched to an exposed surface of the broken object, which surface may be glued or otherwise affixed to the broken object to affect a repair.

The processor 204 may obtain the digital model using, e.g., shape from motion or any other processing technique based upon a sequence of two-dimensional images of an object. The multiple images may be obtained, for example, from a plurality of cameras positioned to provide coverage of different surfaces of the object within the working volume. In another aspect, the one or more spatial sensors may include a single camera configured to navigate around the working volume, e.g., on a track or with an articulating arm. Navigating around the working volume may more generally include circumnavigating the working volume, moving around and/or within the working volume, and/or changing direction to achieve various poses from a single position. The one or more spatial sensors may also or instead include articulating mirrors that can be controlled to obtain multiple views of an object from a single camera.

In another aspect, the one or more spatial sensors 214 may include controllable lighting that can be used, e.g., to obtain different shadowed views of an object that can be interpreted to obtain three-dimensional surface data. The processor 204 (or the second processor 210) may also provide a computer automated design environment to view and/or modify the digital model so that changes, adjustments, additions, and so forth may be made prior to fabrication.

In another aspect, a tool head 220 of the printer may be usefully supplemented with a camera 222. The tool head 220 may include any tool, such as an extruder or the like, to fabricate an object in the working volume of the printer. In general, the tool head 220 may be spatially controlled by an x-y-z positioning assembly of the printer, and the camera 222 may be affixed to and moving with the tool head 220. The camera 222 may be directed toward the working volume, such as downward toward a build platform, and may provide a useful bird's eye view of an object on the build platform. The processor 204 may be configured to receive an image from the camera and to provide diagnostic information for operation of the three-dimensional printer based upon an analysis of the image.

For example, the diagnostic information may include a determination of a position of the tool head within the working volume. The diagnostic information may also or instead include a determination of whether the three-dimensional printer has effected a color change in build material. The diagnostic information may also or instead include a determination of whether the three-dimensional printer has effected a change from a first build material to a second build material. The diagnostic information may also or instead include an evaluation of whether a build material is extruding correctly from the tool head. The diagnostic information may also or instead include an evaluation of whether an infill for the object is being fabricated correctly. In one aspect, the diagnostic information may include the image from the camera, which may be independently useful as a diagnostic tool.

Where the processor 204 is capable of dynamically modifying tool instructions, the processor 204 may be configured to dynamically generate a pattern to infill the object based, for example, on an outline image of the object or previous infilling patterns identified in the image from the camera.

FIG. 3 shows a method for operating a three-dimensional printer. In particular, FIG. 3 shows a technique for using a three-dimensional scanner with the printer to copy objects placed in the printer, or to automatically create geometrically related objects.

As shown in step 302, the method 300 may begin with placing an object in a working volume of a three-dimensional printer such as any of the printers described above.

A shown in step 304, the method may include capturing a three-dimensional image of the object, thereby providing a digital model. This step may be performed for example using any of the three-dimensional sensors or arrangements of sensors described above, or any other combination of hardware and/or software suitable for capturing three-dimensional data as contemplated herein. For example, where shape-from-motion or other optically-based techniques are employed, capturing the three-dimensional image may include capturing a plurality of images of the object with a plurality of cameras positioned to provide coverage of different surfaces of the object within the working volume and processing the plurality of images to obtain the digital model. The plurality of images may also or instead be captured from a plurality of poses with a single camera configured to navigate around the working volume, such as on a track or articulating arm. Similarly, the plurality of images may be captured from a plurality of poses using a single camera and one or more articulating mirrors that provide optical paths to various views of the object. It will further be appreciated that combinations of the foregoing may also be used, such as two cameras and a number of articulating mirrors.

As shown in step 306, the method 300 may include generating tool instructions to fabricate a second object geometrically related to the object with the three-dimensional printer. This digital model for the second object may in general include a copy of the object placed in the working volume, or some derivative object such as a mating part, support stand, holder, container or the like for the object. For example, the second object may be a three-dimensional copy of the object, or the second object may be shaped and sized to enclose a portion of the object, such as to form an enclosure or other container for the object. The second object may similarly include a different object along with a mating surface for mechanically coupling to the object. This may for example include any clips, posts, flanges, or the like suitable for mechanical coupling.

The digital model may be generated using any suitable three-dimensional modeling software. The resulting digital model for the second object may then be converted into tool instructions suitable for execution by a three-dimensional printer. The nature of these tool instructions may of course depend upon the specific hardware and general printing technology employed by the printer. Techniques for generating such tool instructions are well known in the art and are not repeated here.

As shown in step 308, the method 300 may include controlling a three-dimensional printer with the tool instructions to fabricate the second object based upon the digital model.

FIG. 4 shows a method for operating a three-dimensional printer. In particular, the process 400 of FIG. 4 may be used to dynamically modify tool instructions during a three-dimensional fabrication process.

As shown in step 402, the process 400 may begin with the initiation of fabrication of an object. As shown in step 404, the process 400 may include capturing data from the object with one or more spatial sensors. As shown in step 406, the process 400 may include converting the data into a digital model of the object being fabricated, e.g., with a first processor. As shown in step 408, the process 400 may include operating the three-dimensional printer according to a number of tool instructions.

As shown in step 410, the process 400 may include dynamically modifying one of the tool instructions for the three-dimensional printer according to the digital model.

For example, where the object is based upon a second digital model such as a CAD or STL file, this second digital model may be compared to the digital model captured by the spatial sensor(s). This comparison may yield various forms of information. For example, where the dimensions of the object are deviating from those expected based on the second digital model, the dynamic modification to the tool instructions may include one or more changes attempting to return to the intended dimensions such as by shifting, scaling, or otherwise adapting the tool instructions. The comparison may also or instead indicate that a build has failed, for example due to the absence of expected structures, the presence of unexpected structures, a displacement of the object or a portion of the object within the working volume, or other spatial anomalies. In such instances, the dynamic modification to the tool instructions may include an instruction to abort the build or a pause and request for user instructions.

In another aspect, the dynamic modification may be based on the digital model itself without regard to a source digital model for the tool instructions. For example, the digital model may reveal structures, either fabricated or otherwise, within a tool path of the printer, and the second processor may be configured to modify one of the tool instructions to avoid a collision of a tool with the digital model, or stated alternatively, with structures within the working volume of the printer reflected by the digital model. This may, for example, include a foreign body within the working volume. Where a foreign body is detected, the printer may, for example, automatically pause, avoid the foreign body, and resume the print or restart the print at a different location in the build volume.

Other dynamic modifications to tool instructions may also or instead be employed. For example, where the printer is fabricating a multi-part print, e.g., a number of different unconnected (though not necessarily unrelated) parts within the working volume in a single, concurrent build, the second processor may be configured to modify tool instructions to stop printing one part of the multi-part print when the one part has failed to print. This technique may advantageously preserve a number of partially completed, successful objects without wasting build material or fabrication time on failed components within the build. In another aspect, the second processor may be configured to restart printing of the one part at another location within the working volume, subject to capabilities of the printer. This technique may be particularly useful during early stages of a print, e.g., while the first few layers of build material are being deposited and a new object can be included without introducing significant z-axis movements to the printer hardware.

In general, this process 400 may be employed on one of the printers described above, with a first processor capturing and converting data from spatial sensors, which may include any sensor or combination of sensors (including, e.g., cameras) suitable for capturing spatial information from an object as a digital model, and with a second processor (which may optionally be the same as the first processor) configured to dynamically modify a tool instruction according to the digital model, and more generally by comparison to a source model from which the object is fabricated.

Figure 5:
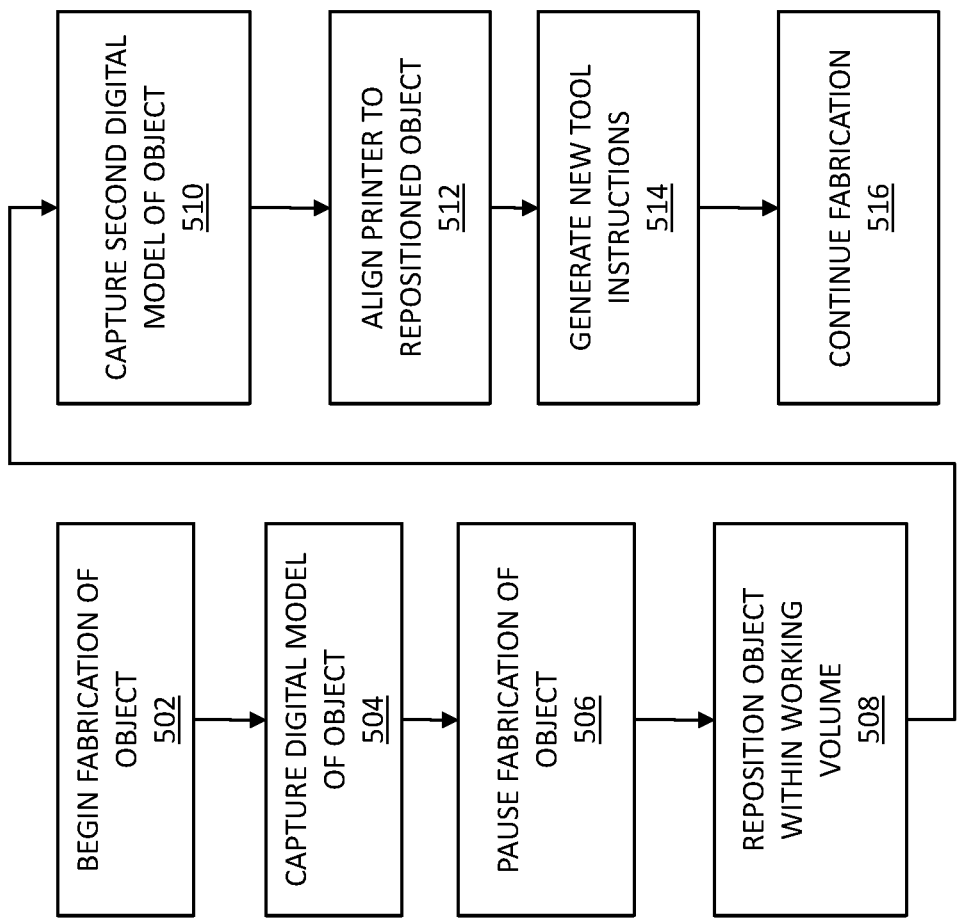
FIG. 5 shows a method for operating a three-dimensional printer.

FIG. 5 shows a method for operating a three-dimensional printer. In particular, the method 500 of FIG. 5 may be used to reacquire a partially completed build within a working volume.

As shown in step 502, the method 500 may start with beginning fabrication of an object in a first location of a working volume with a three-dimensional printer. As shown in step 504, the method 500 may include capturing a digital model of the object with a three-dimensional scanner, such as a scanner using any of the three-dimensional imaging techniques described above, or any other suitable techniques. As shown in step 506, the method 500 may include pausing the fabrication of the object. As shown in step 508, the method 500 may include repositioning the object to a second location within the working volume of the three-dimensional printer. The repositioned object may, for example, be translated, rotated, or some combination of these. As shown in step 510, the method 500 may include capturing a second digital model of the object with the three-dimensional scanner.

As shown in step 512, the method 500 may include aligning the three-dimensional printer to the repositioned object. Where the shape of the object does not change, the x-y-z change to the printer alignment may be determined using a rigid transformation, various techniques for which are known in the art. In greater detail, aligning the three-dimensional printer to the repositioned object may include determining a first point on the object where a deposition of a build material paused, analyzing the second digital model to locate a corresponding point on the repositioned object; and positioning a tool head of the three-dimensional printer to begin depositing the build material at the corresponding point.

As noted above, the repositioning may include rotating the object or translating the object or some combination of these. In certain circumstances such as cases of simple translation, it may be possible to use previous tool instructions along with one or more dynamically maintained translation parameters. Thus for example, the printer may dynamically update spatial information in tool instructions on an instruction-by-instruction basis as the instructions are executed rather than generating new tool instructions to complete fabrication of the object. In certain circumstances, however, it may be necessary or appropriate (depending, e.g., on object symmetry, printer capabilities, and so forth) to generate new tool instructions. Thus the method 500 may include generating new tool instructions to continue the fabrication with the repositioned object, as shown in step 514.

As shown in step 516, the method 500 may include continuing fabrication of the object in the second location. In this manner, a printer using a continuous printing process may be reattached to an object that is intentionally or accidentally dislodged from a location in a working volume.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system, comprising:
a three-dimensional printer having a working volume;
a first processor configured to control operation of the three-dimensional printer to fabricate objects from a build material using a fused deposition modeling process wherein a line of a deposited build material is extruded as a road in a two-dimensional pattern;
a memory storing a log of data aggregated from a plurality of fabrications using a plurality of three-dimensional printers including the three-dimensional printer; and
a print server coupled to the three-dimensional printer through a data network, the print server including a second processor configured to perform an analysis of the log of data to identify at least one feature that fails when printing across a majority of the plurality of fabrications using the plurality of three-dimensional printers, and to adjust at least one parameter of the three-dimensional printer when the at least one feature is present in a printable model before fabricating an object based on the printable model with the at least one feature on the three-dimensional printer.

2. The system of claim 1 wherein the at least one parameter includes one or more of a temperature of the working volume and a temperature of a build platform in the working volume.

3. The system of claim 1 wherein the at least one parameter includes one or more of an extrusion temperature of an extruder and an extrusion rate of the build material from the extruder.

4. The system of claim 1 wherein the at least one parameter includes a viscosity of the build material.

5. The system of claim 1 wherein the at least one parameter includes one or more of a movement speed of an extruder while depositing the build material and a layer height for the build material.

6. The system of claim 1 wherein the memory stores a second log of data, the second log of data including values for the at least one parameter.

7. The system of claim 1 wherein the second processor is configured to analyze the log of data to quantify one or more results of variations in the at least one parameter.

8. The system of claim 1 further comprising a camera configured to capture an image of the working volume.

9. The system of claim 8 wherein the log of data includes images from the camera.

10. The system of claim 8 further comprising a display configured to display a view of the working volume, wherein the one or more of the first and second processor is configured to superimpose thermal data onto the view of the working volume.

11. The system of claim 10 further comprising a thermal camera to capture the thermal data.

12. The system of claim 10 further comprising one or more temperature sensors to capture the thermal data.

13. The system of claim 12 wherein the one or more temperature sensors include a sensor for measuring a temperature of at least one of an extruder, the object, the build material, the working volume, an ambient temperature outside the working volume, and a build platform within the working volume.

14. The system of claim 1 further comprising at least one sensor for capturing three-dimensional data from the object, the at least one sensor including one or more of a laser sensor, an acoustical range finding sensor, an x-ray sensor, and a millimeter wave radar system.

15. The system of claim 14 further comprising a display configured to display a view of the working volume, wherein one or more of the first and second processor is configured to superimpose the three-dimensional data onto the object within the view of the working volume.

16. The system of claim 15 wherein one or more of the first and second processor is further configured to display one or more dimensional inaccuracies in the object.

17. The system of claim 16 wherein one or more of the first and second processor is further configured to display summary data concerning the one or more dimensional inaccuracies.

18. The system of claim 1 wherein the memory is a remote storage device.

19. The system of claim 1 wherein the adjustment to the at least one parameter includes a dynamic modification to tool instructions for fabricating the object.

* * * * *